May 20, 1941.    R. EKSERGIAN    2,242,422
RAILWAY TRUCK
Filed June 22, 1939
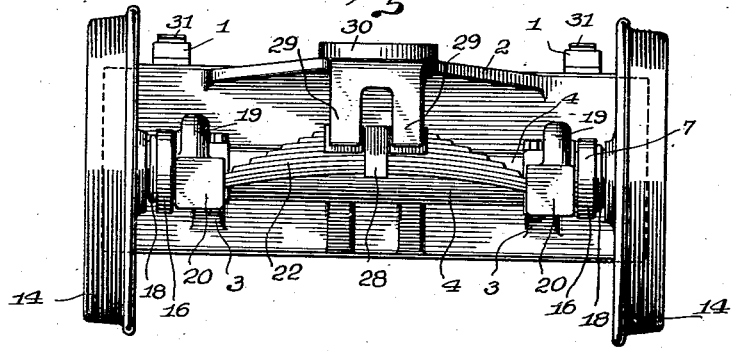
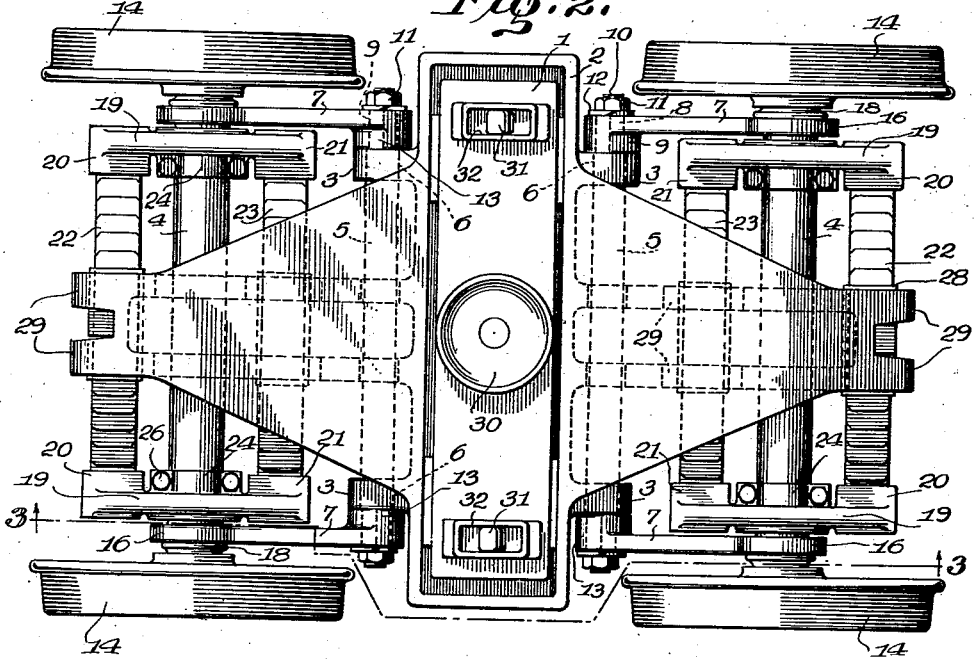
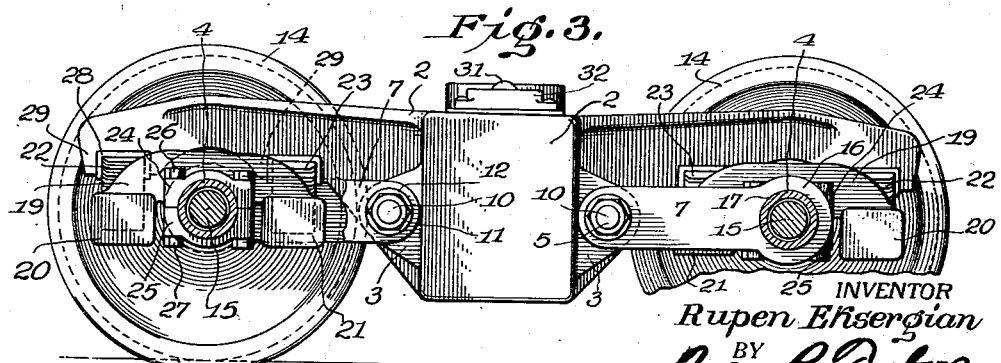
INVENTOR
Rupen Eksergian
BY
ATTORNEY.

Patented May 20, 1941

2,242,422

UNITED STATES PATENT OFFICE 2,242,422

RAILWAY TRUCK

Rupen Eksergian, Lansdowne, Pa., assignor to Edward G. Budd Manufacturing Company, Philadelphia, Pa., a corporation of Pennsylvania Application June 22, 1939, Serial No. 280,482

5 Claims. (Cl. 105—182)

The present invention relates to railway trucks.

More specifically it relates to trucks wherein the axles are supported by composite flat springs, extending generally in a direction parallel to the said axles.

Still more specifically, the truck comprises a number of composite springs, each consisting of bowed spring leaves of varying length assembled on one another, and arranged in the order of their lengths, the longest one at the bottom and resting at both ends on the ends of the adjacent axle or on suitable bearings held thereby, the load to be carried being applied to the shortest spring leaf, which is at the top of the composite spring.

In order to economize the space occupied by the springs, and prevent the vehicle body from being raised too high to accommodate the said springs, in a preferred form a pair of composite springs is provided adjacent each axle, the respective members of the said pair being on opposite sides of the axle, so that thus it is no longer necessary to place the composite spring in the same vertical plane with its axle, thereby making it possible to lower the whole spring assembly very materially.

A further object of the invention is to provide yielding means connecting the opposite wheels of the axle, to permit each wheel to move up or down with respect to the other one and thus adjust the wheels to irregularities of level of the opposite rails. To permit this and yet stabilize the frame laterally a torque member is provided connecting the opposite ends of an axle, adjacent the wheels, so that any difference of elevation of the wheels will be taken up by the torque members, which nevertheless is made of sufficient strength to cause the wheels to move up and down as a unit, and to tend at all times to maintain the transverse stability of the truck frame.

Other objects and advantages of the invention will be noted as the specific description of the invention is developed herein below.

A preferred embodiment of the invention is disclosed in the present specification, reference being had to the accompanying drawing which forms a part thereof.

In the drawing:

Fig. 1 is a front elevation of a truck embodying the invention;

Fig. 2 is a top plan view thereof; and

Fig. 3 is a side elevation, a portion of one of the wheels, and a portion of a supporting arm being broken away, and other parts being shown in section on the planes indicated by the broken line 3—3 of Fig. 2.

Referring to the drawing, it will be seen that the truck comprises a bolster 1 located within the frame 2 having suitable means such as the lugs 3, for securing the non-rotating axles 4, here shown as tubes, in proper horizontally spaced relation to one another. This is accomplished by the torque members, here shown as rods 5, mounted in bores 6 of the said lugs, and carrying the radius arms 7.

The arms 7 are secured to the ends of the rods 5 in any suitable way, for example, the rods may have squared portions 8 near their ends received in square openings 9 in the respective arms, and beyond the squared portions the rods may have screw threaded ends 10, nuts 11 being screwed thereon, with suitable locking means, such as split spring washers 12, interposed. The arms 7 may, if desired, have widened end portions 13, to provide longer seats for the squared parts 8 of the rods 5, as shown best in Fig. 2.

In order that the wheels 14, carried at opposite ends of live axles 15, may have a certain small degree of freedom to move up and down independently of one another, the outer ends of the arms 7 are enlarged as shown at 16, and within said enlarged ends, have bores 17 of spherical-zone shape fitting on correspondingly shaped portions 18 on the tubes 4.

On each tube 4 is a pair of saddles or yokes, 19, one at each end of the tube. Each yoke has two arms, which extend in opposite directions from the respective tube 4, and terminate in sockets 20 and 21. Springs 22 and 23, preferably composite, are supported by the said sockets, the spring 22 having its ends received in the sockets 20, and the spring 23 having its ends in the sockets 21, of each pair.

The yokes 19 are secured to the tubes 4 in any suitable way, for instance by means of the split clamps each comprising the yoke portion 24 and a complementary portion 25, the said portions of the clamps being secured to one another by the bolts 26 and nuts 27. In this way two double-spring supports are provided, each consisting of a pair of springs 22 and 23 supported by the tube 4 by means of the yokes 19 secured thereto at its ends.

The leaves constituting each composite spring may be held together by a suitable retainer, such as 28, at their mid-points and adjacent thereto they may support the frame 2. For this purpose, the said frame has the depending lugs 29, straddling the springs in such way that the frame 2 will be supported at said end by the corresponding pair of composite springs, 22 and 23 by resting upon their middle portions. Since the tubes 4 are free to pivot about their axis, the weight of the frame 2 and any load carried thereby will thus be transferred to the axles 15 of the vehicle wheels 14, which thus will carry substantially equal loads.

The frame 2 may carry the bolster 1 in any suitable manner. Herein it is shown as located in a depression formed in the center of the frame. The bolster 1 may have any desired means for carrying the vehicle, such as the center plate 30 and the rollers 31 in the cages 32.

In operation it is clear that when load is applied to the frame 2, it will be transferred to the four springs 22 and 23, and substantially uniformly shared thereby. Each pair of springs 22 and 23 will in turn transfer its stress to the corresponding pair of saddles or yokes 19, which pass it on to the tubular axle housing 4 secured thereto, and thence to the live axle 15 carried by the same.

When for any reason one wheel 14 must rise or fall with respect to the other wheel 14 on the same axle, this becomes possible by reason of the supporting arm 7 cooperating with the torque rod 5. As long as the whole axle 15 rises or falls as a unit, no twisting of the rod 5 takes place, but whenever one wheel moves more than the other, the rod 5 will be given a twist in one direction or the other, to accommodate such inequality, the "spherical" mountings at the ends of the axle housings 4 making this possible. Similarly, any tendency of the frame to tilt transversely, will be opposed by the torque rods 5.

While each composite spring 22 and 23 is shown as made up of a number of bowed leaves of varying lengths, it is clear that this is merely the preferred form, and that the number of leaves may be varied as desired without departing from the spirit of the invention, and in extreme cases only a single leaf may be used in each spring.

I claim:

1. A railway truck comprising a frame, a yoke pivoted to the frame, said yoke comprising a torsion element mounted to turn freely on its axis in the frame and having an arm at each end thereof, an axle mounted in the ends of the yoke arms, whereby said ends of the axle have a slight amount of independent vertical movement, two transverse springs, a cross piece carried at each end of the axle, said springs being located in front of and behind said axle respectively and having their ends carried by the cross pieces, the frame of the truck being in turn supported by said springs.

2. A railway truck comprising a frame, an axle, a torsion yoke comprising a torsion element extending substantially parallel to the axle, said yoke being mounted on the frame to pivot freely about the axis of said torsion element and supporting the axle, so that its ends may move jointly without stressing the yoke and may also move independently by putting the yoke under torsional stress, and an upwardly-bowed transverse spring supported at its ends by the corresponding ends of the axle and thus permitting such independent movements thereof, said spring supporting the frame at an intermediate point.

3. A railway truck comprising a frame, a yoke comprising a torsion rod pivoted to the frame to turn freely about its axis in its frame, and arms secured to the ends of the rod, an axle mounted in the ends of the yoke arms, two transverse springs, and two cross pieces carried one at each end of the axle, said springs being located in front of and behind said axle respectively and having their ends carried by the cross pieces, the frame of the truck being in turn supported by said springs.

4. A railway truck comprising a frame, two yokes, one pivoted at each end thereof, each yoke comprising a torsion rod with an arm at each end thereof and the rod mounted to turn freely on its axis in the frame, two axles, one supported by the arms of each yoke, a cross piece at each end of each axle, and a pair of transverse springs for each axle, said springs being supported at their ends in the cross pieces, and the frame having projecting portions at each end, resting upon intermediate portions of the springs of both pairs.

5. A railway truck comprising a frame, a pair of horizontal torsion rods extending transversely across the frame near the center thereof, means pivotally securing said rods to the frame, an arm at each end of each rod having one end secured to the rod, an axle mounted for a limited extent of universal motion in the other ends of the arms of each rod, whereby each axle may move vertically freely without stressing the corresponding torsion rod, and may also tilt by subjecting said rod to torsional stress, a pair of springs for each axle, each such pair having their ends connected to the corresponding ends of the axle and having their central parts bearing against the under side of the frame, so that such springs will thus carry the frame and any load thereon.

RUPEN EKSERGIAN.